United States Patent [19]

Ohyama

[11] Patent Number: 4,458,235

[45] Date of Patent: Jul. 3, 1984

[54] FOREGROUND SUBJECT-IDENTIFYING APPARATUS

[75] Inventor: Masumi Ohyama, Tokyo, Japan

[73] Assignee: Tokyo Shibaura Denki Kabushiki Kaisha, Kawasaki, Japan

[21] Appl. No.: 237,845

[22] Filed: Feb. 25, 1981

[30] Foreign Application Priority Data

Feb. 27, 1980 [JP] Japan .................................. 55-23716

[51] Int. Cl.³ .............................................. G01S 9/56
[52] U.S. Cl. ..................................... 382/1; 343/6.5 SS
[58] Field of Search ................. 343/6.5 R, 6.5 LC, 55, 343/6.8 R, 6.8 L C, 7 ED, 7.5; 340/38 L, 567, 825.54, 825.73, 825.74, 146.3 K

[56] References Cited

U.S. PATENT DOCUMENTS

| | | | |
|---|---|---|---|
| 3,363,247 | 1/1968 | Chausse et al. | 343/6.5 SS |
| 3,772,668 | 11/1973 | Smith | 343/6.5 SS |
| 3,859,624 | 1/1975 | Kriofsky et al. | 343/6.5 SS |
| 4,069,472 | 1/1978 | Kamata et al. | 343/6.5 SS |
| 4,209,783 | 6/1980 | Ohyama et al. | 343/6.5 LC |
| 4,263,595 | 4/1981 | Vogel | 343/6.5 SS |
| 4,339,753 | 7/1982 | Mawhinney | 343/6.5 SS |

Primary Examiner—Leo H. Boudreau
Attorney, Agent, or Firm—Cushman, Darby & Cushman

[57] ABSTRACT

A foreground subject-identifying apparatus includes a signal transmitter for sending forth microwave question signals; a code signal generator for emitting a code signal in response to a question signal delivered from the signal transmitter; and signal-receiving device for interpreting code signal received from the code signal generator. The signal transmitter intermittently generates a microwave check signal in a first operation mode, and sends forth a microwave question signal in a second operation mode. The code signal generator sends forth an output signal in response to a check signal delivered from the signal transmitter, and then the signal receiver causes the signal transmitter to be set at the second operation mode to generate a question signal.

3 Claims, 3 Drawing Figures

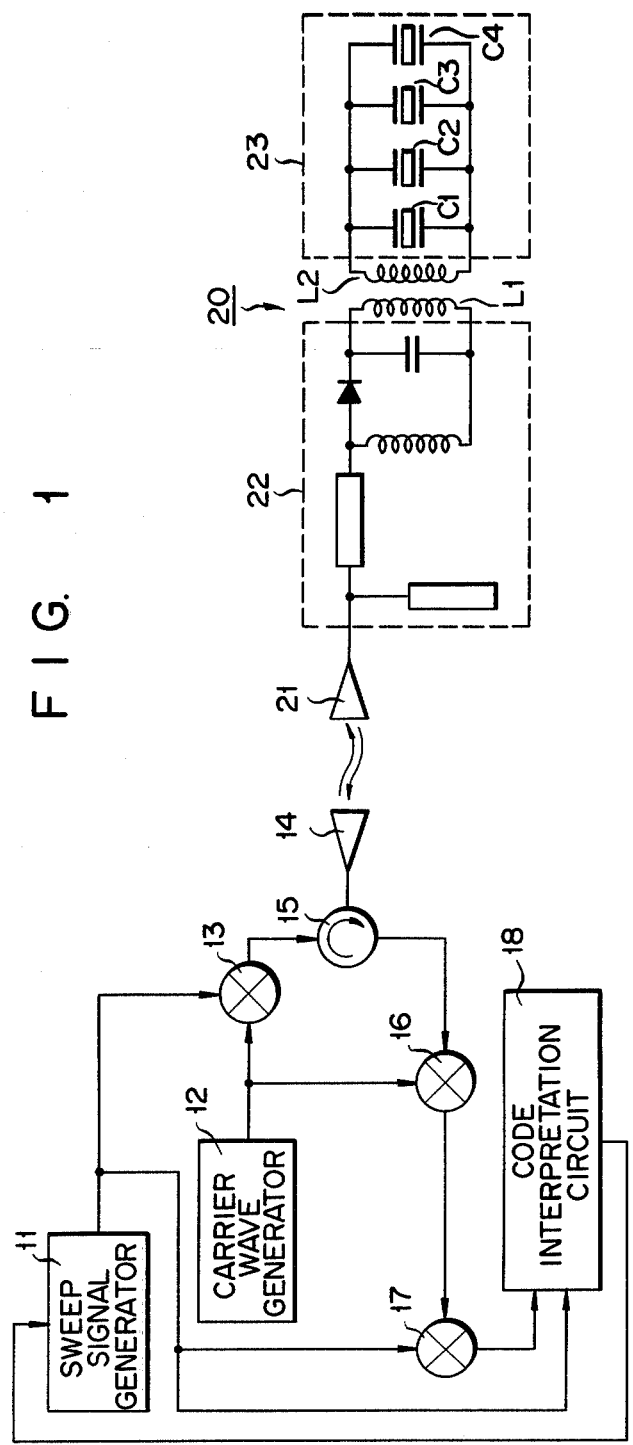
F I G. 1
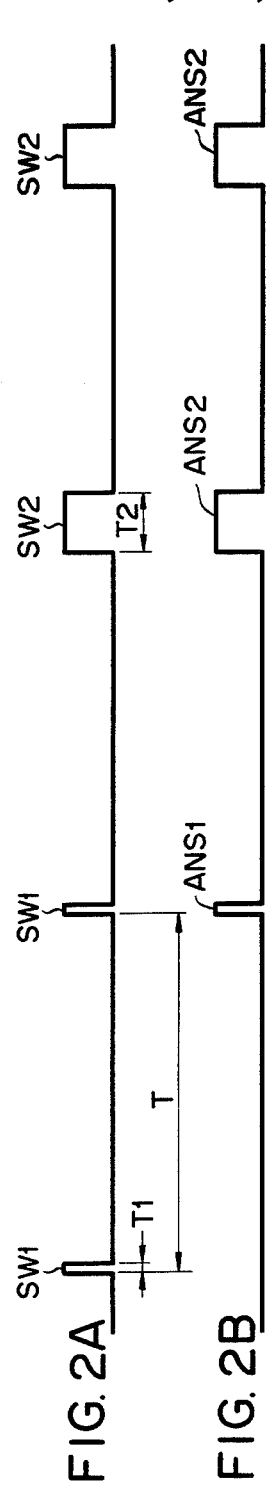
FIG. 2A
FIG. 2B

FOREGROUND SUBJECT-IDENTIFYING APPARATUS

This invention relates to a foreground subject-identifying apparatus.

A foreground subject-identifying apparatus known to date is the type whose interrogating device sends forth microwaves to a responding device specified by a particular code and fitted to a foreground subject such as a freight car or bus, and which processes answer signals received from the responding device, thereby identifying a foreground subject. The responding device used in such case is advantageously formed of a power source-free type which automatically responds to microwaves emitted from the interrogating device without using a power source. With the abovementioned type of foreground subject-identifying apparatus, the interrogating device is so constructed as to always emit microwaves ranging from several hundred milliwatts or several watts. However, the magnitude of microwave outputs should be minimized in consideration of the possible effect of microwaves on men and beasts.

It is accordingly an object of this invention to provide a foreground subject-identifying apparatus which can reliably identify a foreground subject by sending forth microwave outputs with as small a magnitude as possible.

According to an aspect of this invention, there is provided a foreground subject-identifying apparatus comprising signal-transmitting means which, in a first operation mode, intermittently emits a microwave check signal having at least a first frequency, and, in a second operation mode, issues a question signal having at least a second frequency different from the first frequency, code signal-generating means which produces a first prescribed code signal in response to a check signal sent forth from the signal-transmitting means, and issues a second code signal peculiar to the code signal-generating means upon receipt of a question signal from the signal-transmitting means, and signal-receiving means, which sets the signal-transmitting means at the second operation mode in response to the first code signal supplied from the code signal-generating means, and sends forth an output signal corresponding to the second code signal upon receipt of the second code signal from the code signal-generating means, and wherein the signal receiving and transmitting means constitute an interrogating device, and the code signal-generating means forms the responding device.

A foreground subject-identifying apparatus embodying this invention normally sends forth a check signal intermittently to ascertain the presence of a foreground subject, thereby prominently reducing the consumption of microwave power.

This invention can be more fully understood from the following detailed description when taken in conjunction with the accompanying drawing, in which:

FIG. 1 is a block circuit diagram of a foreground subject-identifying apparatus embodying this invention; and FIGS. 2A and 2B show signal waveforms by way of illustrating the operation of the foreground subject-identifying apparatus of FIG. 1.

A foreground subject-identifying apparatus of FIG. 1 embodying this invention includes an interrogating device 10 for issuing a microwave question signal and a responding device 20 which is fitted to, for example, one outer side surface of a vehicle to be identified and sends forth an answer signal including a specific code in response to a question signal issued from the interrogating device 10. This interrogating device 10 is actuated upon receipt of an answer signal generated from the responding device 20 to interpret the specific code of the answer signal.

The interrogating device 10 includes a sweep signal generator 11 for emitting a sweep signal whose frequency varies from 2.6 MHz to 0.86 MHz in a length of time of 2 milliseconds repeatedly at an interval of 30 milliseconds, and a carrier wave generator 12 for issuing a carrier wave having a frequency of, for example, 2.45 GHz. Output signals from the sweep signal generator 11 and carrier wave generator 12 are supplied to a frequency mixer 13, where an output carrier wave from the carrier wave generator 12 is modulated by an output sweep signal from the sweep signal generator 11. An output signal from the frequency mixer 13 is transmitted to a transmitting/receiving antenna 14 through a circulator 15, and then emitted to a responding device 20. Where an answer signal of a specific code delivered from the responding device 20 is received by the antenna 14, then the received signal is conducted to a frequency mixer 16 through the circulator 15, together with an output carrier wave from the carrier wave generator 12. The frequency mixer 16 mixes the received signal and output carrier wave. An output signal from the frequency mixer 16 is supplied to another frequency mixer 17 which is also supplied with a sweep signal from the sweep signal generator 11. As a result, the frequency mixer 17 emits a beat signal including a beat signal component or components at a frequency or frequencies corresponding to the specific code of an answer signal sent forth from the responding device 20. An output beat signal from the frequency mixer 17 is conducted to a code interpretation circuit 18, where the specific code of the responding device 20 is interpreted.

The responding device 20 receives a question signal sent forth from the antenna 14 of the interrogating device 10 at transmitting/receiving antenna 21 formed of, for example, a waveguide or plain slot antenna. The received signal is demodulated by a nonlinear circuit 22, which in turn delivers a demodulated signal having the same frequency as a sweep signal to an inductor L1. Later, the demodulated signal is supplied to a coding circuit or resonance filter 23 through an inductor L2 electromagnetically coupled to the inductor L1. The resonance filter 23 includes parallel connected resonance circuits C1 to C4 whose resonance frequencies f1 to f4 have different values within the frequency range of a sweep signal, for example, within the frequency range from 0.86 MHz to 2.6 MHz.

An output signal from the resonance filter 23 which includes signal components corresponding to resonance frequencies f1 to f4 is emitted to the interrogating device 10 through the inductors L2, L1, nonlinear circuit 22 and antenna 21. A signal received by the antenna 14 is converted into a beat signal including beat signal components corresponding to the frequencies f1 to f4. After processed in the aforementioned manner, the converted signal is interpreted by the code interpretation circuit 18.

Detailed description is already given in the U.S. Pat. No. 4,069,472 of a circuit corresponding to the fundamental circuit portion of the foreground subject-identifying apparatus of FIG. 1 embodying this invention.

According to the present invention, the sweep signal generator 11 produces in a first operation mode a sweep signal SW1 whose frequency varies from 2.6 MHz to 2.47 MHz in a period T1 of 150 microseconds repeatedly at an interval T of 30 milliseconds. Where the responding device 20 receives a check signal from the interrogating device 10 which corresponds to the sweep signal SW1, that is, where the responding device 20 set on a running vehicle is brought into an area in which the interrogating device 10 can carry out an identifying operation, then a resonance circuit C1 having a resonance frequency f1 of, for example, 2.5 MHz is brought into a resonance mode. However, the resonance circuits C2 to C4 having resonance frequencies f2 to f4 lower than 2.47 MHz do not resonate. In the above-mentioned case, the responding device 20 emits an answer signal ANS1 (shown in FIG. 2B) including a resonance signal component having a resonance frequency f1. The answer signal ANS1 notifies that the responding device 20 is brought into an area where the interrogating device 10 can carry out an identifying operation. The answer signal ANS1 is received by the interrogating device 10 and processed in the aforesaid manner. When detecting that the received signal contains a resonance signal component corresponding to a resonance frequency f1, the code interpretation circuit 18 sends forth a second operation mode-specifying signal to the sweep signal generator 11, which in turn is set at a second operation mode. As a result, the sweep signal generator 11 produces a sweep signal SW2 of FIG. 2A whose frequency repeatedly varies from 2.6 MHz to 0.86 MHz in a period of 2 milliseconds at an interval of, for example, 30 milliseconds. Where the responding device 20 receives from the interrogating device 10 a question signal corresponding to the sweep signal SW2, then the resonance circuits C1 to C4 having resonance frequencies f1 to f4 are all set into a resonance mode. In this case, the responding device 20 emits an answer signal ANS2 (FIG. 2B) including resonance signal components having resonance frequencies f1 to f4. The answer signal ANS2 is received by the interrogating device 10 and processed in the aforementioned manner. When detecting that the received signal contains a resonance signal component having the resonance frequency f1, the code interpretation circuit 18 issues a second operation mode-specifying signal to the sweep signal generator 11. When detecting that the received signal contains resonance signals having other resonance frequencies f2 to f4, the code interpretation circuit 18 interprets a specific code representing an answer signal delivered from the responding device 20. The above-mentioned operation cycle is repeated, until a running vehicle passes beyond a place in which the interrogating device 10 is installed, and the responding device 20 of the vehicle ceases to respond to a question signal SW2. Where an answer signal ANS2 is no more sent forth from the responding device 20, then the interrogating device 10 is set at the first operation mode and issues a check signal SW1.

For example, the sweep signal generator 11 includes a first sweep signal-generating section which sends forth a sweep signal whose frequency repeatedly varies from 2.6 MHz to 0.86 MHz in a period of 2 milliseconds at an interval of, for example, 30 milliseconds; a second sweep signal-generating section which emits a sweep signal whose frequency repeatedly varies from 2.6 MHz to 2.47 MHz in a period of 150 microseconds at an interval of 30 milliseconds; and a switching circuit selectively permitting the transmission of an output signal from the first or second sweep signal-generating section in response to an operation mode-specifying signal from the code interpretation circuit 18. Obviously, the sweep signal generator 11 can effect the same function by a different arrangement from that described above.

Description is now given of how much a foreground subject-identifying apparatus embodying this invention can be reduced in the consumption of average signal transmission power. Assume now that vehicles to be identified pass the proximity of an interrogating device 10 at a speed of 50 kilometers; this interrogating device 10 can carry out identification within an area whose diameter measures one meter; and the interrogating device 10 identifies 50 vehicles on the average per hour. In this case, an average length of time T0 for which, for example, all 50 vehicles remain per hour in the above-defined area of identification may be expressed by the following formula:

$$T0 = \left( \frac{1m}{50 \text{ km/h}} \right) \times 50 = 3.6 \text{ sec}$$

Since time T2 for which a question signal SW2 is generated at an interval of 30 msec is 2 msec, a total length of time T3 for which question signals SW2 are actually generated per hour is given as follows:

$$T3 = \frac{2}{30} T0 = 0.24 \text{ (msec)}$$

A total length of time T4 for which check signals SW1 are issued per hour may be calculated as follows:

$$T4 = (3{,}600 - 3.6) \text{ sec} \times \frac{T1}{T0}$$
$$= 3{,}596.4 \text{ sec} \times \frac{0.15}{30}$$
$$= 21.5 \text{ sec}$$

Therefore, the duty factor Df of an output signal from the sweep signal generator 11 may be expressed by the following formula:

$$Df = \frac{T3 + T4}{3{,}600} = \frac{0.24 + 21.5}{3{,}600} = \frac{1}{166}$$

This means that an average power consumption in the intermittent emission of microwave question signals according to the method of this invention is reduced to about 1/166 of that which is required for the continuous emission of microwave question signals as has been carried out by the conventional foreground subject-identifying apparatus.

This invention has been described with reference to the foregoing embodiment. However, the invention is not limited to the embodiment. The circulator 15 and antenna 14 were used with the foreground subject-identifying apparatus of FIG. 1. Instead, it is possible to connect a transmission antenna to a frequency mixer 13 and connect a receiving antenna to another frequency mixer 16. Further with the aforesaid embodiment, the resonance circuit C1 is used to emit a resonance signal component indicating that the responding device 20 is brought into an area in which the interrogating device 10 can identify the responding device 20. The resonance circuits C2 to C4 are used to send forth resonance signal components denoting the specific codes of the responding devices 20 of the respective vehicles to be identified. However, it is possible to apply a plurality of resonance circuits in issuing resonance signal components in order to detect that the responding devices 20 of the respective running vehicles are brought into an area in which they can be identified. It is also possible to use one, two, or more than three resonance circuits in emitting resonance signal components indicating the specific codes of the responding devices 20 of running vehicles. Further the periods T0, T1, T2 can be properly varied with the running speed of vehicles to be identified. It is also possible to completely divide the frequency range of the check signal and question signal from each other.

What is claimed is:

1. A foreground subject-identifying apparatus comprising:
   signal-transmitting means, which, in a first operation mode, intermittently sends forth a microwave check signal having at least a first frequency, and, in a second operation mode, emits a microwave question signal having at least a second frequency which is different from the first frequency;
   a responding device including a transmitting/receiving antenna, a nonlinear circuit connected to said transmitting/receiving antenna, a coding section including a plurality of resonance circuits, and electromagnetically coupling means connected between said nonlinear circuit and coding section to transfer a signal therebetween, said responding device generating a first prescribed code signal in response to a check signal delivered from said signal-transmitting means, and producing a second specified code signal in response to a question signal supplied from said signal-transmitting means; and
   signal-receiving and interpreting means which sets the signal-transmitting means at the second operation mode in response to a first code signal from said responding device, and is actuated in response to a second code signal delivered from said responding device to produce an output signal corresponding to the second code signal, said signal-transmitting means and signal-receiving and interpreting means constituting an interrogating device.

2. A foreground subject-identifying apparatus according to claim 1, wherein said interrogating device comprises:
   a sweep signal generator which, in a first operation mode, emits a first sweep signal whose frequency varies within a range including at least a first prescribed frequency, and, in a second operation mode, sends forth a second sweep signal whose frequency varies within a frequency range at least partly different from that of the first sweep signal;
   a carrier wave generator;
   a first frequency mixer for mixing output signals from said sweep signal generator and carrier wave generator;
   a transmitting/receiving antenna section having a power receiving terminal and a power supply terminal connected to the first frequency mixer;
   a second frequency mixer connected to the output terminal of said carrier wave generator and the power receiving terminal of said transmitting/receiving antenna section;
   a third frequency mixer for mixing output signals from the sweep signal generator and second frequency mixer; and
   a code interpretation circuit which is supplied with an output signal from said third frequency mixer, and sets said sweep signal generator at the second operation mode when detecting that an output signal from said third frequency mixer contains a signal component corresponding to the first output code signal from said response device.

3. A foreground subject-identifying apparatus according to claim 2, wherein said transmitting/receiving antenna section comprises a circulator and a transmitting/receiving antenna connected to said circulator.

* * * * *